US010467535B2

(12) United States Patent
Anbil Parthipan et al.

(10) Patent No.: US 10,467,535 B2
(45) Date of Patent: Nov. 5, 2019

(54) MODIFYING AN APPEARANCE OF A GUI TO IMPROVE GUI USABILITY

(71) Applicant: International Business Machines Corporation, Armonk, NY (US)

(72) Inventors: Sarath C. Anbil Parthipan, Batlagundu (IN); Vijay Ekambaram, Chennai (IN); Nitendra Rajput, Gorgaon (IN); Giriprasad Sridhara, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 133 days.

(21) Appl. No.: 15/843,079

(22) Filed: Dec. 15, 2017

(65) Prior Publication Data

US 2018/0107362 A1   Apr. 19, 2018

Related U.S. Application Data

(63) Continuation of application No. 14/933,008, filed on Nov. 5, 2015, now Pat. No. 9,946,437.

(51) Int. Cl.
*G06F 3/048* (2013.01)
*G06N 5/02* (2006.01)
*G06N 3/08* (2006.01)

(52) U.S. Cl.
CPC ............. *G06N 5/022* (2013.01); *G06N 3/088* (2013.01)

(58) Field of Classification Search
CPC .................................................... G06N 5/022
USPC ......................................................... 715/762
See application file for complete search history.

(56) References Cited

U.S. PATENT DOCUMENTS

| 7,603,367 | B1 * | 10/2009 | Kanter .................. G06F 16/00 |
| 8,869,049 | B1 | 10/2014 | Li et al. |
| 9,069,374 | B2 | 6/2015 | Sudhakar Palla et al. |
| 9,111,219 | B1 | 8/2015 | Mohla et al. |
| 9,161,172 | B2 | 10/2015 | Poduri et al. |
| 9,367,123 | B2 | 6/2016 | Jain et al. |
| 9,626,097 | B2 | 4/2017 | Jeon et al. |
| 9,798,760 | B2 | 10/2017 | Sayers |

(Continued)

OTHER PUBLICATIONS

P. Mell et al., "The NIST Definition of Cloud Computing", National Institute of Standards and Technology, Information Technology Laboratory, Sep. 2011, pp. 1-7.

(Continued)

*Primary Examiner* — David Phantana-angkool
(74) *Attorney, Agent, or Firm* — Law Office of Jim Boice

(57) ABSTRACT

A computer-implemented method modifies a graphical user interface (GUI) for an application to improve GUI usability. One or more processors identify a current GUI that is utilized by a current software application. The processor(s) match the current GUI to other GUIs that have a same function, semantics, and context of the current GUI. The processor(s) identify a top-k active field used by the other GUIs, and match a function of a current active field from the current GUI to a function of the top-k active field used by the other GUIs. In response to a visual appearance of the current active field from the current GUI not matching a visual appearance of the top-k active field used by the other GUIs, the processor(s) replace the current active field with the top-k active field in the current GUI in order to improve usability of the current GUI.

20 Claims, 13 Drawing Sheets

(56) References Cited

U.S. PATENT DOCUMENTS

| | | | | |
|---|---|---|---|---|
| 9,805,306 | B1* | 10/2017 | Bataller | G06N 5/022 |
| 9,946,437 | B2* | 4/2018 | Anbil Parthipan | G06N 5/022 |
| 2011/0225291 | A1 | 9/2011 | Dobroth et al. | |
| 2012/0021774 | A1 | 1/2012 | Mehta et al. | |
| 2012/0291022 | A1 | 11/2012 | Mehta et al. | |
| 2013/0085886 | A1 | 4/2013 | Satish et al. | |
| 2013/0086597 | A1 | 4/2013 | Cornwall et al. | |
| 2014/0089531 | A1 | 3/2014 | Bhogal et al. | |
| 2014/0137080 | A1 | 5/2014 | Huang et al. | |
| 2015/0169759 | A1 | 6/2015 | Ronen et al. | |
| 2017/0131867 | A1 | 5/2017 | Anbiil Parthipan et al. | |

OTHER PUBLICATIONS

Mikolov, Tomas, Ilya Sutskever, Kai Chen, Greg Corrado, and Jeffrey Dean. "Distributed Representations of Words and Phrases and Their Compositionality." NIPS (2013).

Mikolov, Tomas, Kai Chen, Greg Corrado, and Jeffrey Dean. "Efficient Estimation of Words Representations in Vector Space." ICLR (2013).

Google Project Hosting. "word2vec: Tool for Computing Continuous Distributed Representations of Words" Code. google.com/p/word2vec. Web. Oct. 27, 2015.

Eth Zurich. "Programming Tools with Big Data and Conditional Random Fields." Software Reliability Lab. Web. Oct. 27, 2015.

Suzuki, Takayuki, Kazunori Sakamoto, Fuyuki Ishikawa, and Shinichi Honiden. "An Approach for Evaluating and Suggesting Method Names Using N-Gram Models." ICPC, Proceedings of the 22nd International Conference on Program Comprehension, 2014, pp. 271-274. Abstract.

Høst, Einar and Bjarte Østvold. "Debugging Method Names." ECOOP, Object-Oriented Programming, 2009, vol. 5653 pp. 294-317. Abstract.

List of IBM Patents or Patent Applications Treated as Related. Dec. 15, 2017.

* cited by examiner

# MODIFYING AN APPEARANCE OF A GUI TO IMPROVE GUI USABILITY

BACKGROUND

The present disclosure relates to the field of graphical user interfaces (GUIs) used with software applications, and specifically to an appearance of GUIs. More specifically, the present disclosure relates to optimizing an appearance of a GUI to improve a user experience with the GUI.

SUMMARY

In one or more embodiments of the present invention, a computer-implemented method modifies a graphical user interface (GUI) for an application to improve GUI usability. One or more processors identify a current GUI that is utilized by a current software application. The processor(s) match the current GUI to other GUIs that have a same function, semantics, and context of the current GUI. The processor(s) identify a top-k active field used by the other GUIs, and match a function of a current active field from the current GUI to a function of the top-k active field used by the other GUIs. In response to a visual appearance of the current active field from the current GUI not matching a visual appearance of the top-k active field used by the other GUIs, the processor(s) replace the current active field with the top-k active field in the current GUI in order to improve usability of the current GUI.

In one or more embodiments of the present invention, the computer-implemented method is implemented as a computer program product and/or in a system.

DETAILED DESCRIPTION

Figure 1:
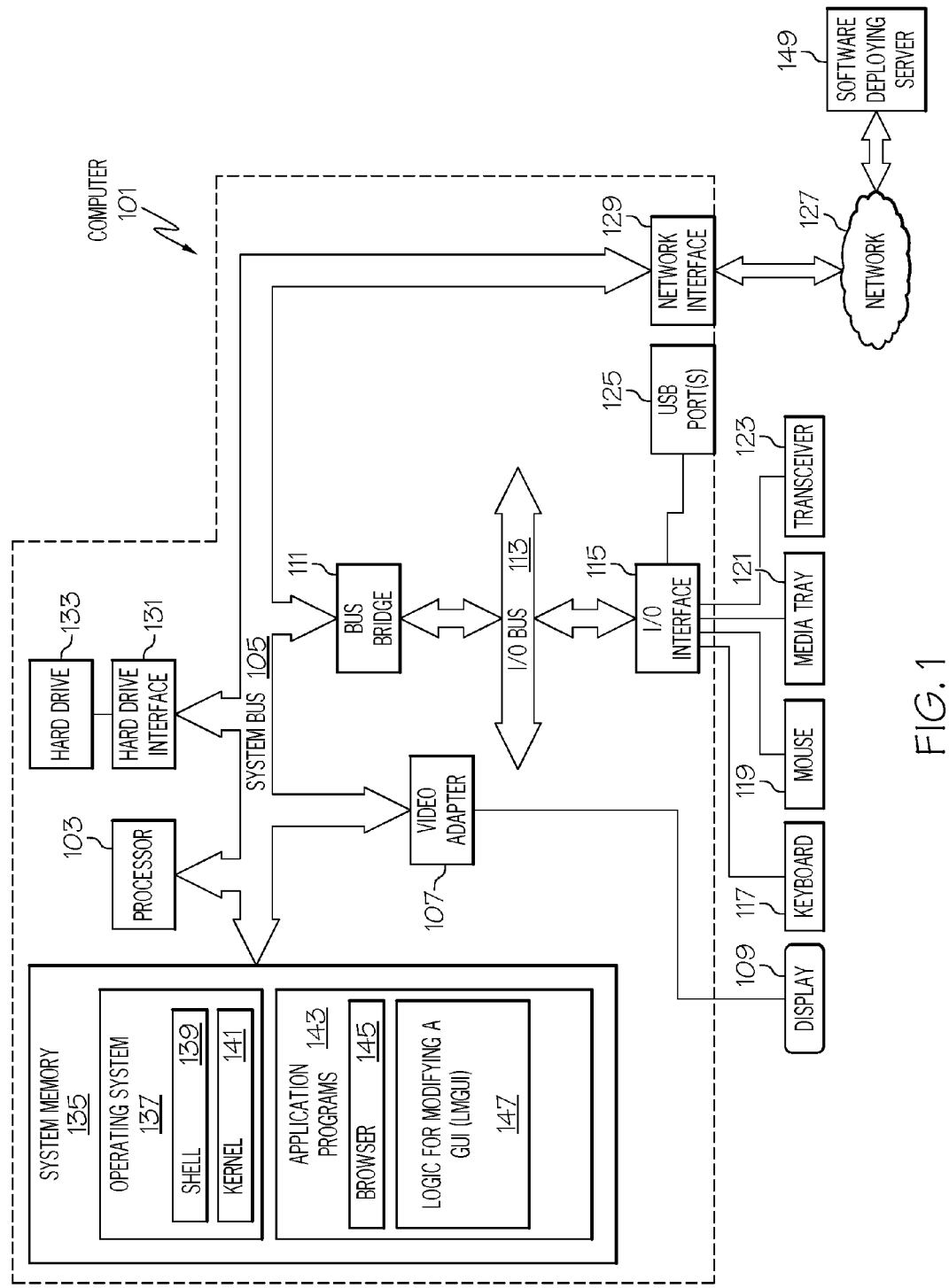
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 shown in FIG. 1.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), a transceiver 123 (capable of transmitting and/or receiving electronic communication signals), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include Logic for Modifying a Graphical User Interface (LMGUI) 147. LMGUI 147 includes code for implementing the processes described below, including those described in FIGS. 2-9. In one embodiment, computer 101 is able to download LMGUI 147 from software deploying server 149, including in an on-demand basis, wherein the code in LMGUI 147 is not downloaded until needed for execution. In one embodiment of the present invention, software deploying server 149 performs all of the functions associated with the present invention (including execution of LMGUI 147), thus freeing computer 101 from having to use its own internal computing resources to execute LMGUI 147.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

As described herein, the present invention addresses usability issues associated with graphical user interfaces (GUIs) that have an unconventional appearance. For example, assume that a developer has created a GUI for a phone app (i.e., software application that runs on a mobile device such as a smart phone) that is highly original and creative. While such originality and creativity may seem admirable, in practice this often leads to a GUI that is so strange that it is hard to use, thus leading to an ineffective app. For example, assume that the developer assigned an icon that looks like a floppy disk to destroy a file, since he saw a floppy disk melt in a favorite spy movie. However, most users would assume that clicking the floppy disk icon will actually save the user's data. Thus, when they click the floppy disk, their data is inadvertently destroyed, such that the app (and thus the phone/computer on which the app is running) functions poorly. While this example is somewhat extreme, there are many other instances in which the distinction between a useful icon (or other active field) on the GUI and a misleading icon/active field on the GUI are not so obvious. The present invention provides a new and useful solution to this problem.

Usability issues with a GUI are any issues in the GUI (including but not limited to mobile GUIs used on smart phones, etc.) that make an end-user uncomfortable when working with the application. The present invention addresses such usability issues, including but not limited to: widget labels that are not intuitive and do not match the purpose of the GUI or active field, thus leading to user confusion; widget icons that are not intuitive and do not match the purpose of the GUI or active field, thus leading to user confusion; developers who use textual labels instead of standardized icons, thus leading to a poor overall appearance of the GUI; and/or inconsistency in widget properties (i.e., font, layout, color, etc.) based on the purpose of the application and the industry specific styles, thus leading to user confusion and poor GUI appearances.

Thus, the present invention addresses the problem of, given an input application, how to model a cognitive tool that figures out in an automated fashion widget label text/ icons that are intuitive to the end-user and that appropriately match the purpose of the application while conforming to industry standards. If the presently used label text/icons are confusing or do not conform to industry standards, then the present invention suggests alternative (preferably well known and intuitive) replacement labels/icons for use by the GUI.

The present invention presents a novel deep learning based cognitive framework to resolve usability issues in mobile apps using the following methods: (i) building a neural mobile screen knowledge base in which mobile screens of famous apps (e.g., most frequently downloaded from an app store) are semantically, contextually, and compactly captured through neural embedding vectors; (ii) leveraging this knowledge-base to semantically as well as contextually retrieve similar screens of well known (famous) applications that have the same purpose and context of the current input screen, given an input mobile screen; and (iii) using the semantically retrieved similar screens of famous apps to identify usability issues in the given current input screen and provide solutions to improve the usability of the current input screen.

Often, developers may not use intuitive or user-friendly labels for widgets shown to users such as text boxes, buttons, etc. Also, labels used should match appropriately to the purpose of the application.

Figure 2:
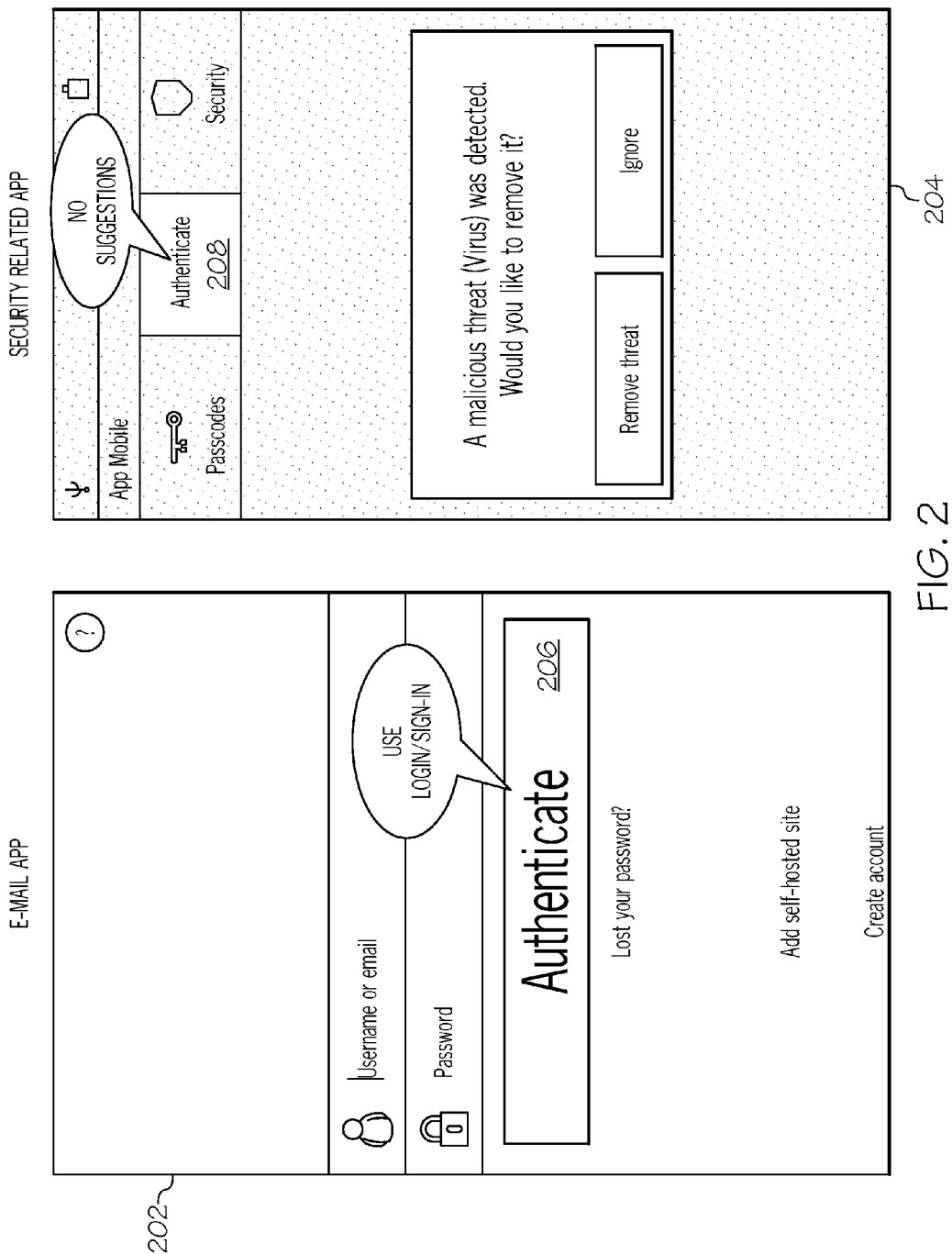
FIG. 2 illustrates two exemplary graphical user interfaces (GUIs) that respectively use the term "authenticate" improperly and properly.

For example, consider GUI 202 and GUI 204 shown in FIG. 2. As shown, GUI 202 is for an e-mail app, while GUI 204 is a security related app. In GUI 202, button 206 is labeled "Authenticate", and is to be clicked after the user has entered his/her user name and password, thus logging that user into the system. However, a more common (and thus less confusing) label for button 206 would have been "Login" or "Sign-in". As such, the present invention will automatically rename button 206 with the text "Login" or "Sign-in". However, in GUI 204 the button 208 labeled "Authenticate" is accurate, since it is clicked in order to allow the user to authorize the system to remove the detected virus. As such, button 208 remains labeled as "Authenticate".

In other embodiments of the present invention, an app developer may use unusual and/or confusing icons to represent certain events. For example and with reference to FIG. 3, consider GUI 301 and GUI 303, each of which is used with an e-mail or messaging app. In GUI 301, the developer has elected to use an icon 305 that looks like a bugle, thus suggesting an alert that a new message has arrived. While perhaps clever and evocative, icon 305 is likely to not be intuitive to a user (i.e., the user will not know what a bugle is supposed to represent). As such, the icon 305 will be replaced with a traditional icon 307, shown in GUI 303 as a note pad or an envelope (another traditional symbol for a new message).

In other embodiments of the present invention, the app developer may use an irregular layout and/or an unconventional font (e.g., as preferred for use by a particular enterprise) on the GUI. For example, consider GUI 402 and GUI 404 shown in FIG. 4, both of which are used in an e-mail/ messaging app. GUI 402 follows the convention of placing the icon 406 for new messages in the top right corner of the GUI 402, and uses a convention font 410 to display the messages. However, GUI 404 places the same icon 406 (now depicted as icon 408) in the lower right-hand corner of the GUI 404, and uses a different font 412 than font 410 shown in use by GUI 402. Thus, the present invention will reconfigure GUI 404 to look more like GUI 402, including the placement of icon 406/408, the use of font 410, the placement of other instructions such as "<Back", "Edit", etc., as well as the title of the app ("Messages" instead of "Inbox").

Figure 5:
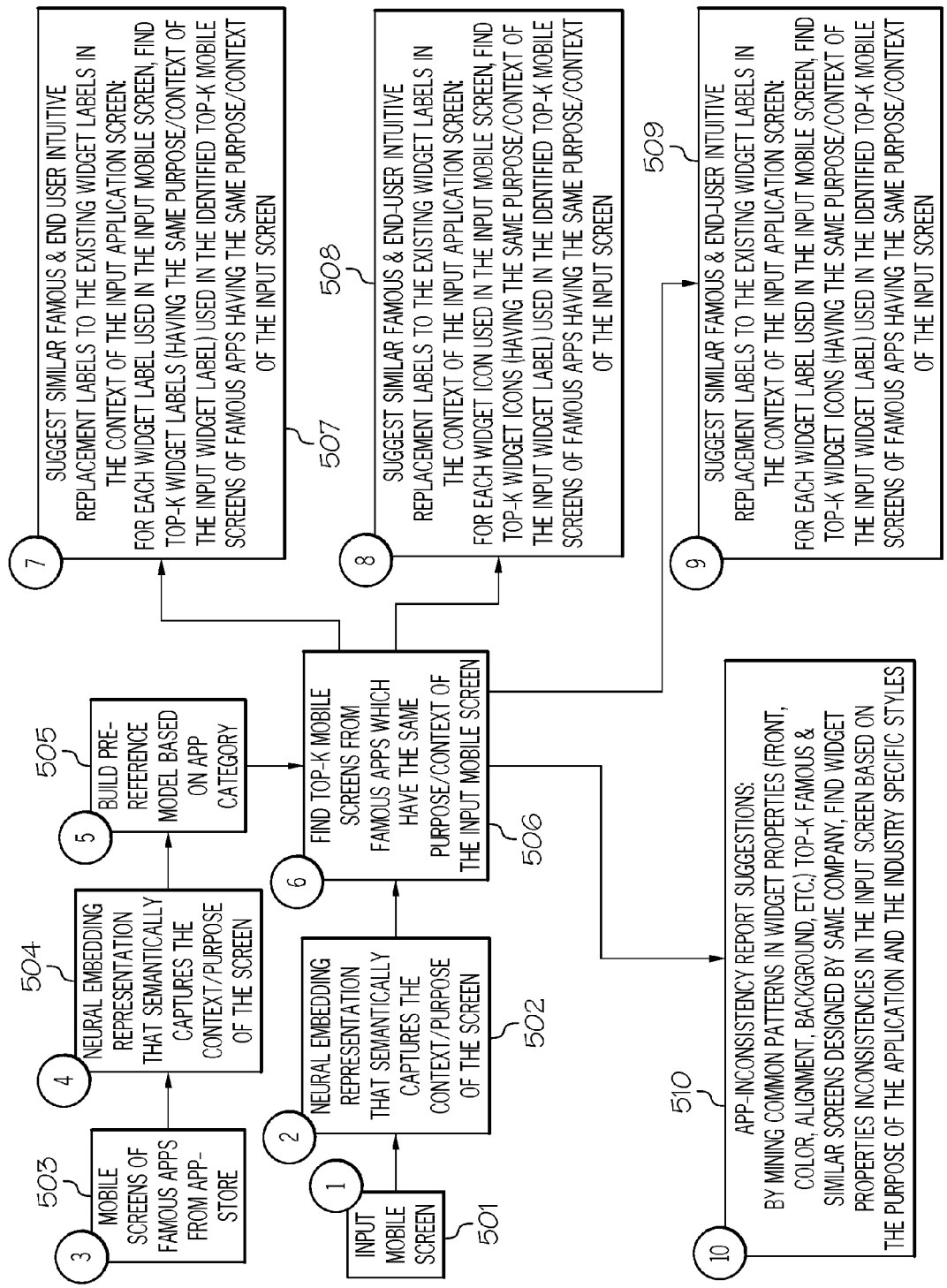
FIG. 5 presents a high-level overview of exemplary steps performed in one or more embodiments of the present invention.

With reference now to FIG. 5, a high-level flow chart of one or more embodiments of the present invention to modify a GUI in order to improve usability and functionality of an app is presented. As shown in block 501, a component of a GUI for an app is received by the system as a mobile screen (e.g., from a smart phone GUI) input. The components are identified as output as mobile screen layout files (e.g., string and/or XML files) to a system that creates a neural embedding representation of the current GUI (see block 502). That is, in block 501 the system retrieves all activities for a particular application from a manifest file (which is associated with that particular application). Each activity is loaded into an emulator, and a GUI layout file for all of the activities of the application is dumped into a system that generates a GUI rendered XML, file of the activities that are rendered in the emulator.

As depicted in block 502, a neural-embedding vector representation is determined for each mobile screen (i.e., GUI) in the application of interest. Thus, the output from block 501 is used as an input to block 502, and the output from block 502 is the neural embedding vector representation for all of these mobile screens.

Figure 6:
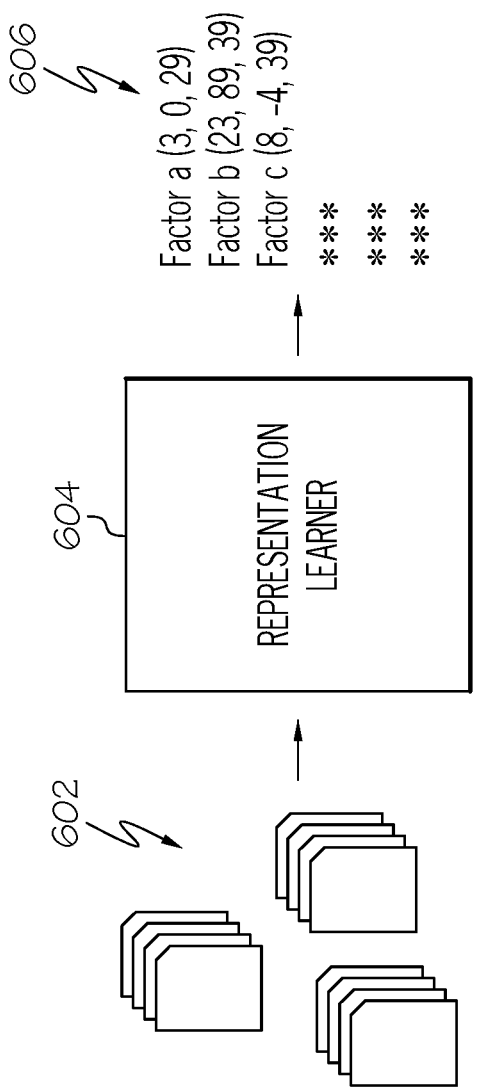
FIG. 6 depicts a representation learner utilized in one or more embodiments of the present invention.

With reference now to FIG. 6, an exemplary process for generating values used to create a neural-embedding vector representation of apps and/or their active fields is presented.

As shown in FIG. 6, inputs 602 (i.e., the outputs from block 501 in FIG. 5) are input into a representational learner 604, which is based on a neural probabilistic language model. This technique understands the context of each word from the GUI and represents each word as a vector in N-d space. Using this technique, similar words gets plotted closer in N-d space, where N is the vector size of the word representation. For example, the word "Test-case" and the word "Test-script" will lie very close together in the N-d space using this representation. In another example, the word "testing" will also lie close to both "Test-case" and "Test-script", but the distance between "test-case" and "test-script" will be closer than the distance between "test-case" and "testing". Using representations 606, the system converts every widget label in the mobile screen layout files in to its corresponding neural embedding vector in N-d space.

Now each mobile screen is represented as a neural embedding vector, which is computed from the vector representations of the label text/accessibility text in the mobile screen layout files (obtained above). For icons, the neural embedding vector representation of the accessibility text corresponding to the icons is used. Thus, for a mobile screen $r_i$ with n label texts (w1, w2, ..., wn), $$r_i = \Sigma_{j=1}^{n} tf\text{-}idf(w_j) * \text{embedding}(w_j)$$

where tf-idf($w_j$) is the term frequency * inverse document frequency of a label text and embedding ($w_j$) is the vector representation of the label text learned in unsupervised representation learning. In one embodiment of the present invention, priority is assigned to the widgets in the screen based on some predefined rules (e.g., the importance of an input widget to the functionality of the app, etc.). Based on the widget priorities, a weighted average of all the vectors corresponding to the labels displayed in the screen is calculated, and a mobile screen vector is generated as an n-dimensional real vector representation, such as (1.2, −3.4, 0.3) in 3-dimensions.

This neural embedding vector representation for mobile screens ensures that vectors of widgets on a screen that have a same purpose/context come closer together in N-d space (i.e., are close in terms of Euclidean or cosine distances). This allows the system to generate a neural embedding vector representation for all screens of the application of interest.

Returning now to FIG. 5, as depicted in block 503 mobile screens from commonly used apps (e.g., found in an app store) are deconstructed (as in block 501 for the current app) and inserted into an engine that generates a neural embedding representation that semantically captures the context/purpose of the other (famous, common, well-known) apps, as described in block 504 (analogous to block 502).

Figure 7A:
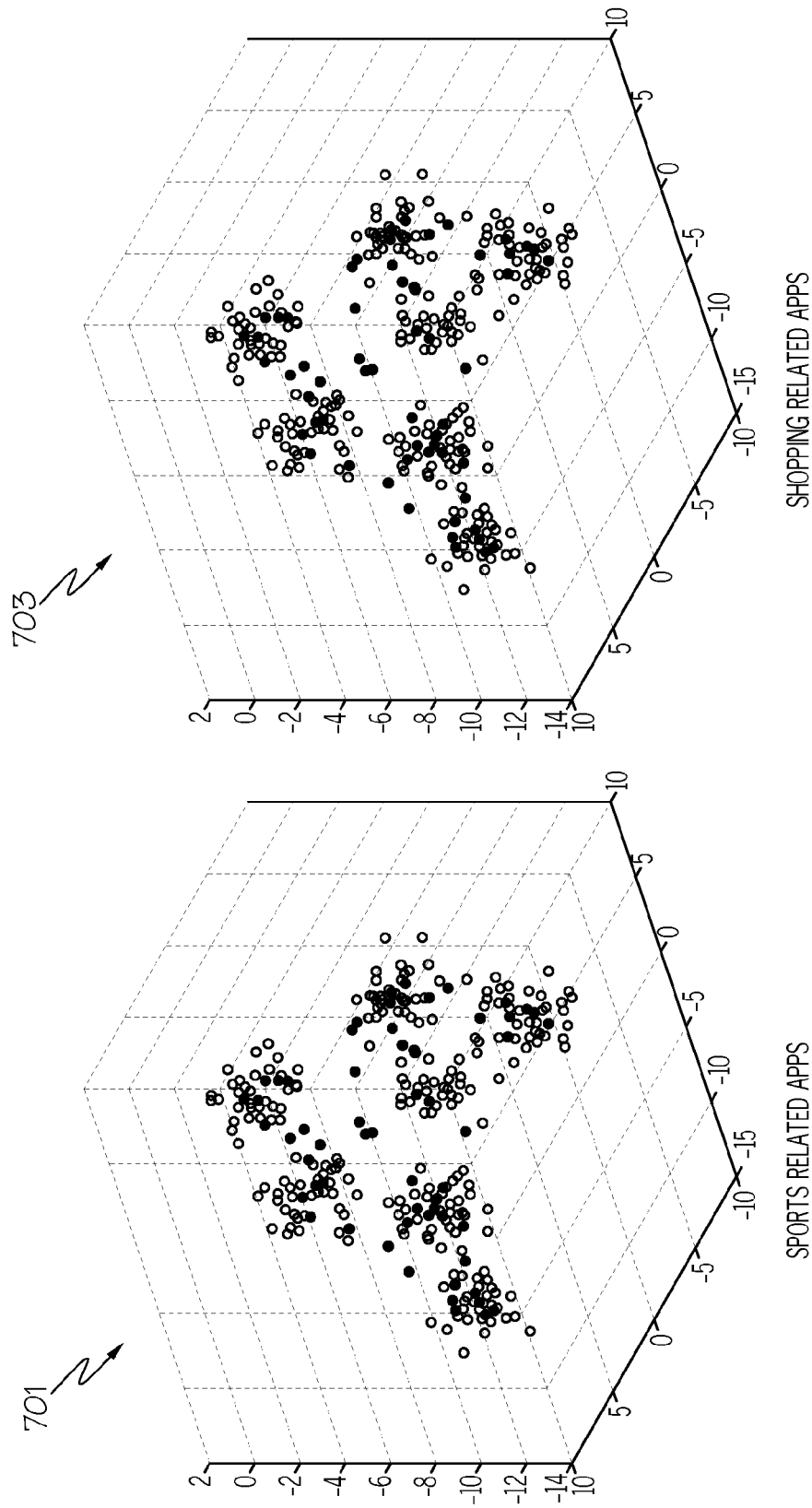
FIG. 7A-7B illustrates various neural models generated for various contexts and subjects for use in one or more embodiments of the present invention.
Figure 7B:
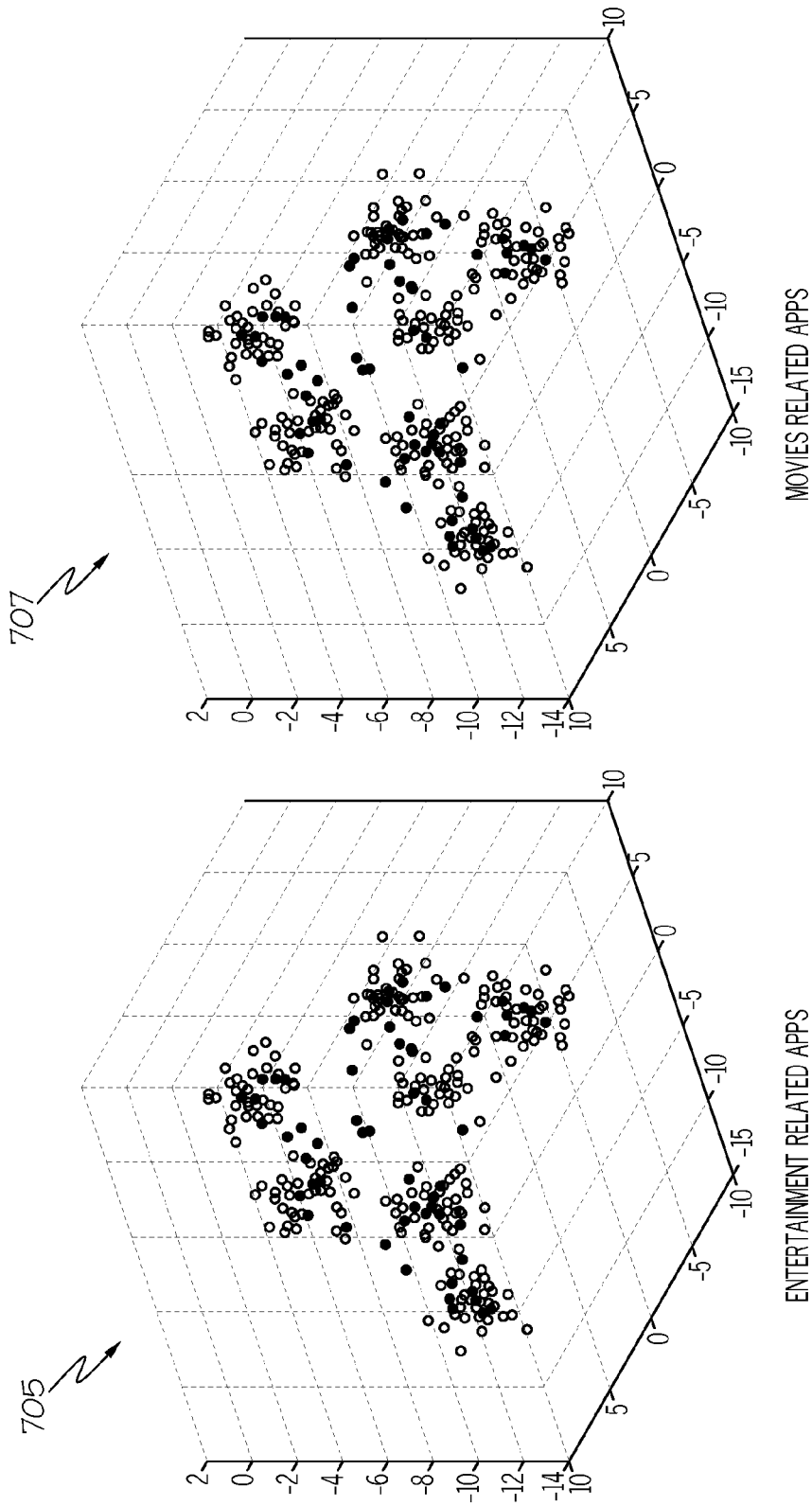

Thus, as depicted in block 505, vector representations for all screens of famous apps, based on app categories, plot each app and/or widget within the app in an N-d space separately based on the app category. For example, as shown in FIGS. 7A-7B, sports related apps will have N-d graph 701, shopping related apps will have N-d graph 703, entertainment related apps will have N-d graph 705, movies related apps will have N-d graph 707, etc., each of which provide a reference model against which a current app is compared. The greater the number of apps considered, the better the prediction of the current system in determining the optimal widgets/layout to be used in the current GUI for the current app. Since the system is automated, one or more processors can generate scripts to get neural embedding vector representations of all screens of many famous apps in various app categories. In one or more embodiments, a graphics processing unit is dedicated to the process of generating the N-d graphs, thus improving the operation of the computer system upon which the present invention is being implemented.

Figure 8:
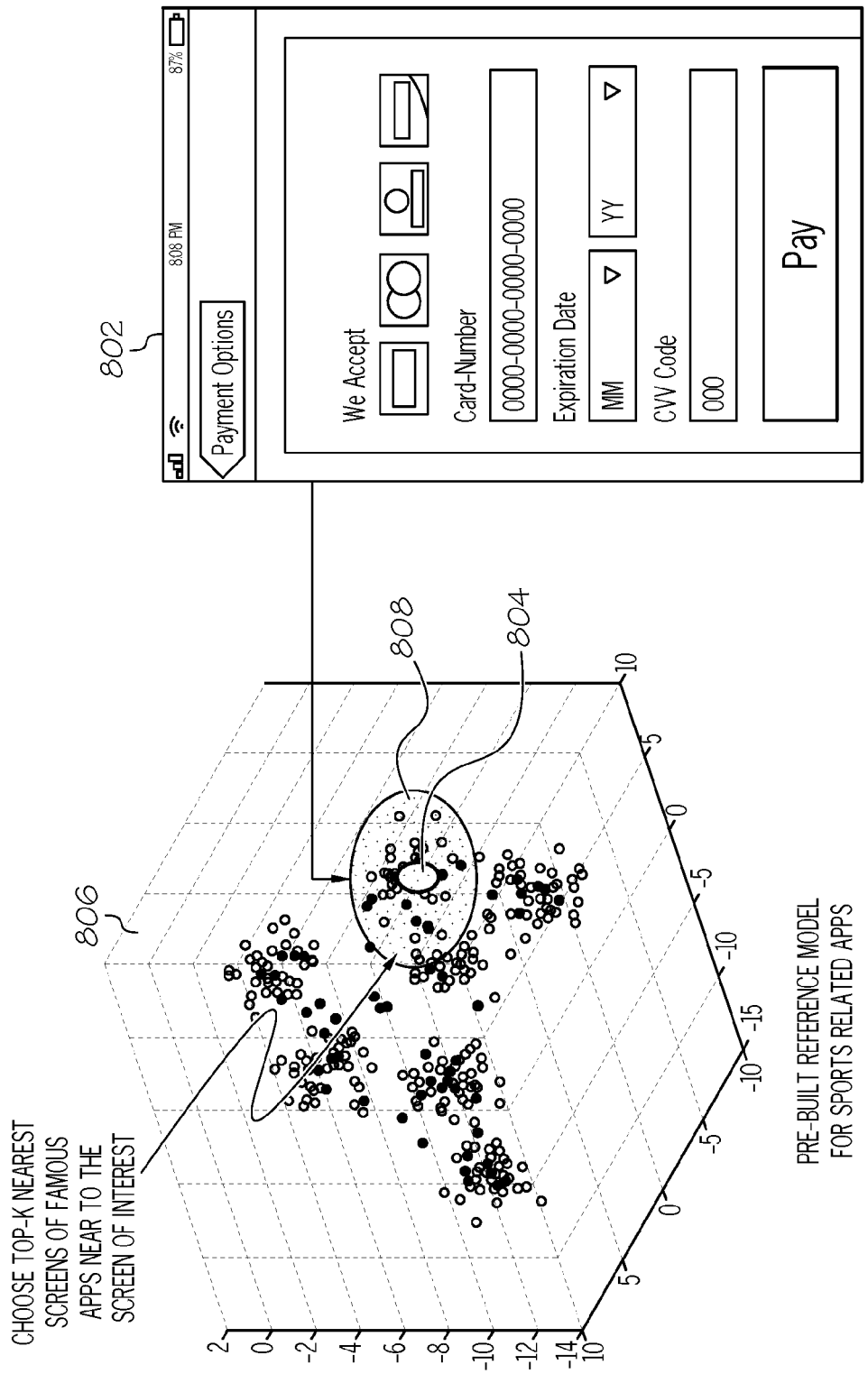
FIG. 8 depicts a current GUI being mapped to a pre-built reference model in accordance with one or more embodiments of the present invention.

Given a current app screen (i.e., for an app devoted to a particular purpose, such as tracking sporting events), the present invention converts the current app into a vector representation and plots it against the pre-built reference graph. For example, as shown in FIG. 8, a vector representing GUI 802 is depicted as a plot 804 on a 3-d graph 806, which has plotted points that represent a large quantity of other apps (see blocks 503-505 in FIG. 5). The 3-d vector distance 808 identifies which other apps are most closely related to app 802 based on the distance to plot 804. This provides a determination of which GUI plotted/represented in 3-d graph 806 is closest in function, context, and semantics as that of GUI 802.

Thus, as depicted in FIG. 8, the plot of the current GUI is plotted to determine the Euclidean distance to the top-k (i.e., most closely related in terms of context, semantics, and function) apps from an app store. These screens (GUIs) are screens of famous apps that have the same context/purpose of the given current app screen.

Similarly, an N-d graph can be generated for the widgets themselves, such that the Euclidian distance between plots representing widgets in the current app is measured to plots representing widgets from other apps. Thus, for each widget label in the given app screen, the distance to the top-k (nearest) labels is determined (see block 507 in FIG. 5). Thus, by choosing the top-k widgets (from other famous apps) based on the Euclidean distance to the label of the widget from the current app (e.g., based on the Euclidian distance between words used by the various widgets), the system derives the top-k alternative labels having the same meaning and also used by other famous app screens having the same purpose/context. After getting the top-k words for a given widget label, the words are sorted again based on the Euclidean distance between the input (current) mobile screen and the (other) mobile screens from which these labels are obtained.

The present invention also takes care of providing similar label text writing style words (formal, informal, etc.) as alternatives in the top of the list. Thus, a mobile screen (GUI) that is very close to the input screen in N-d space will not only be similar in the context/purpose of the app screen, but will also be similar in the word writing style of the app screen. Since top-k words are sorted by the Euclidean distance between the screens, alternative suggested labels which come in at the top of the list not only have the same meaning as the old label in the context of the app, but it provide labels of similar word writing styles. Writing style of labels means the common style followed by many labels in the screen (i.e. correlation of label styles using different features which is learned in an unsupervised way and represented in the neural embedding vector).

If the given widget label is used in the set of labels retrieved, the label is tagged as an intuitive label. Otherwise, the top-k nearest words provide the suggested label for the current app's related widget. For example, if an application is a business related app and the developer has used "Authenticate" as the label for a button to log in to the app (see FIG. 2), the present system suggests the use of "login" or "sign-in", which are commonly used labels instead of using "authenticate". However, if the application is a security related app, then "authenticate" itself will be the most-intuitive label as there will be many other famous apps having the label "authenticate" that use the same label. In this scenario, the present system will not suggest any alternatives, as the currently used widget label itself is intuitive and famous (i.e., well known and most commonly used).

The presently presented invention does not just provide similar meaning phrases to a label. Rather, the present invention provides similar famous and end-user replacement phrases for use in labeling widgets in the context of the input app.

For each icon (with an accessibility text) the present system returns top-k accessibility text (each associated with an icon) in famous similar apps of the same context (see block 508 and/or block 509 in FIG. 5). Thus, the system will suggest similar famous and end-user intuitive replacement icons to widget icons in the context of the input app (see block 508 in FIG. 5).

Furthermore, the system can suggest similar famous and end-user intuitive replacement icons for widget labels (if any are available) in the context of the input app (see block 509 in FIG. 5) by applying the following process. While retrieving top-k similar labels for an input widget label, the system uses both accessibility text and label text to retrieve top-k similar labels/icons for a given label text. Using this, the system suggests similar famous and end-user intuitive replacement icons used in a famous app for a widget label text. For example, if the current app uses "Save" as a label text for a widget button, the present invention suggests a save icon (e.g., a picture of a floppy disk) to replace the text-described button.

Given an input screen, the present invention suggests top-k similar screens having the same context/purpose of the current input screen (GUI).

As described in block 510 in FIG. 5, one embodiment of the present invention detects any inconsistency in widget properties (i.e. font, layout, color, etc.) based on the purpose of the application and the industry specific styles. From these top-k similar screens, the present system retrieves a similar screen, and applies unsupervised pattern matching to retrieve any common patterns in font, color, layout, etc. in the top-k similar screen having the same context and purpose. By validating/comparing these common patterns with the input screen, the present invention auto-generates an industry-style specific widget property inconsistency report. Based on the suggestions provided in the report, the present invention automatically modifies the string and layout XMLs of the app screen, in order to build the application and show variants of the same input application.

Thus, in one or more embodiments of the present invention, variations in different GUIs are collected to determine patterns in widget/font/layout/etc. usage. These patterns thus allow the system to determine 1) the most commonly used types of widgets/fonts/layouts/etc., in order to 2) automatically transform a currently-evaluated GUI that uses a less common type of widget/font/layout/etc. into a GUI that uses the most commonly used types of widgets/fonts/layouts/etc.

Figure 9:
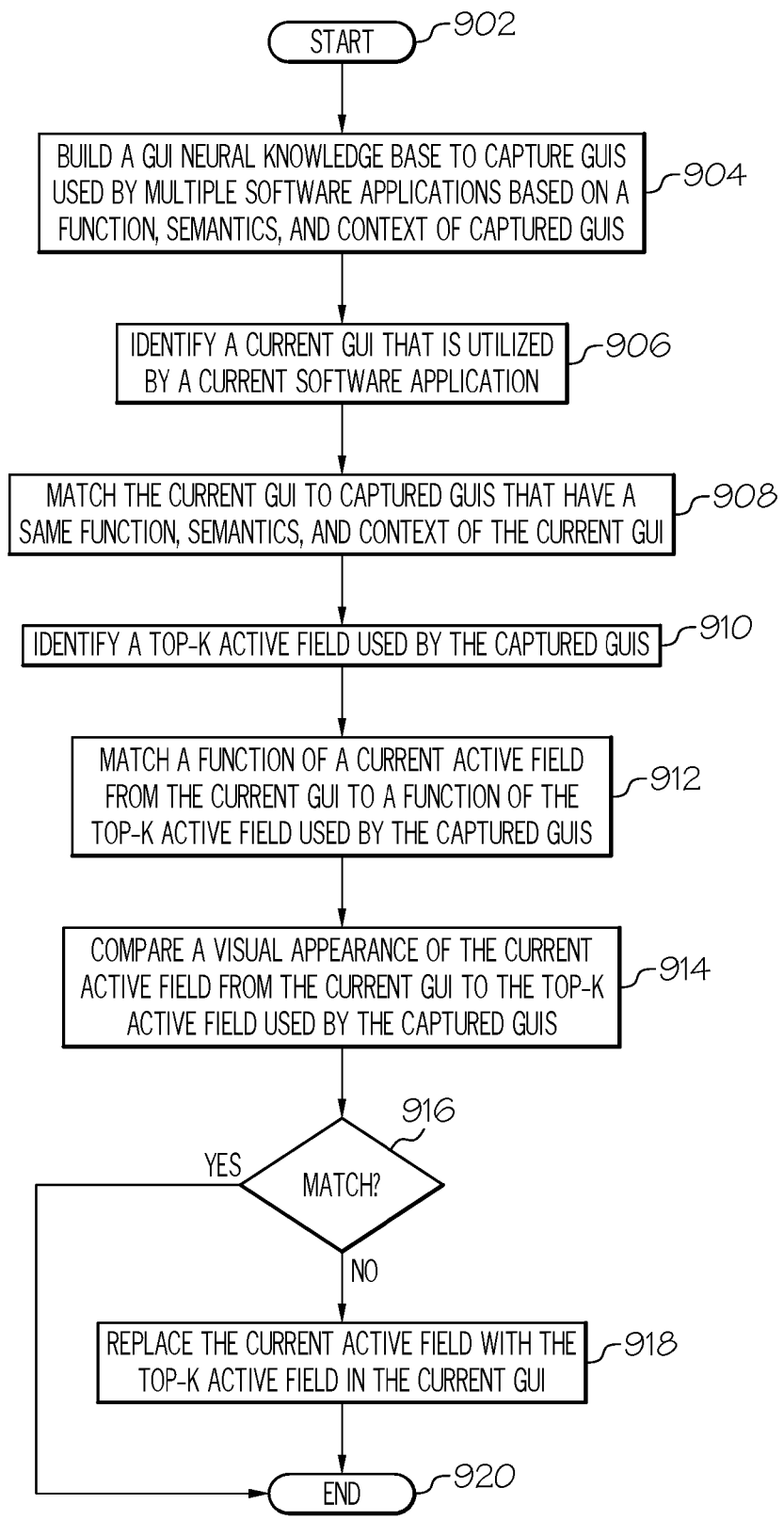
FIG. 9 is a high-level flow chart of one or more steps performed by one or more processors to modify a GUI in order to improve the usability of the GUI.

With reference now to FIG. 9, another high-level flow chart of one or more steps performed by one or more processors to modify a GUI in order to improve the usability of the GUI is presented.

After initiator block 902, one or more processors build a graphical user interface (GUI) neural knowledge base (e.g., see FIG. 7), as described in block 904. As described herein, the GUI neural knowledge base captures GUIs used by multiple software applications based on a function, semantics, and context of captured GUIs.

As described in block 906, the processor(s) identify a current GUI (e.g., GUI 802 shown in FIG. 8) that is utilized by a current software application.

As described in block 908, the processor(s) match the current GUI to captured GUIs that have a same function, semantics, and context of the current GUI.

As described in block 910, the processor(s) identify a top-k active field used by the captured GUIs, where the top-k active field is used more frequently than any other active fields in the captured GUIs to have the same function, semantics, and context of the current GUI.

Figure 3:
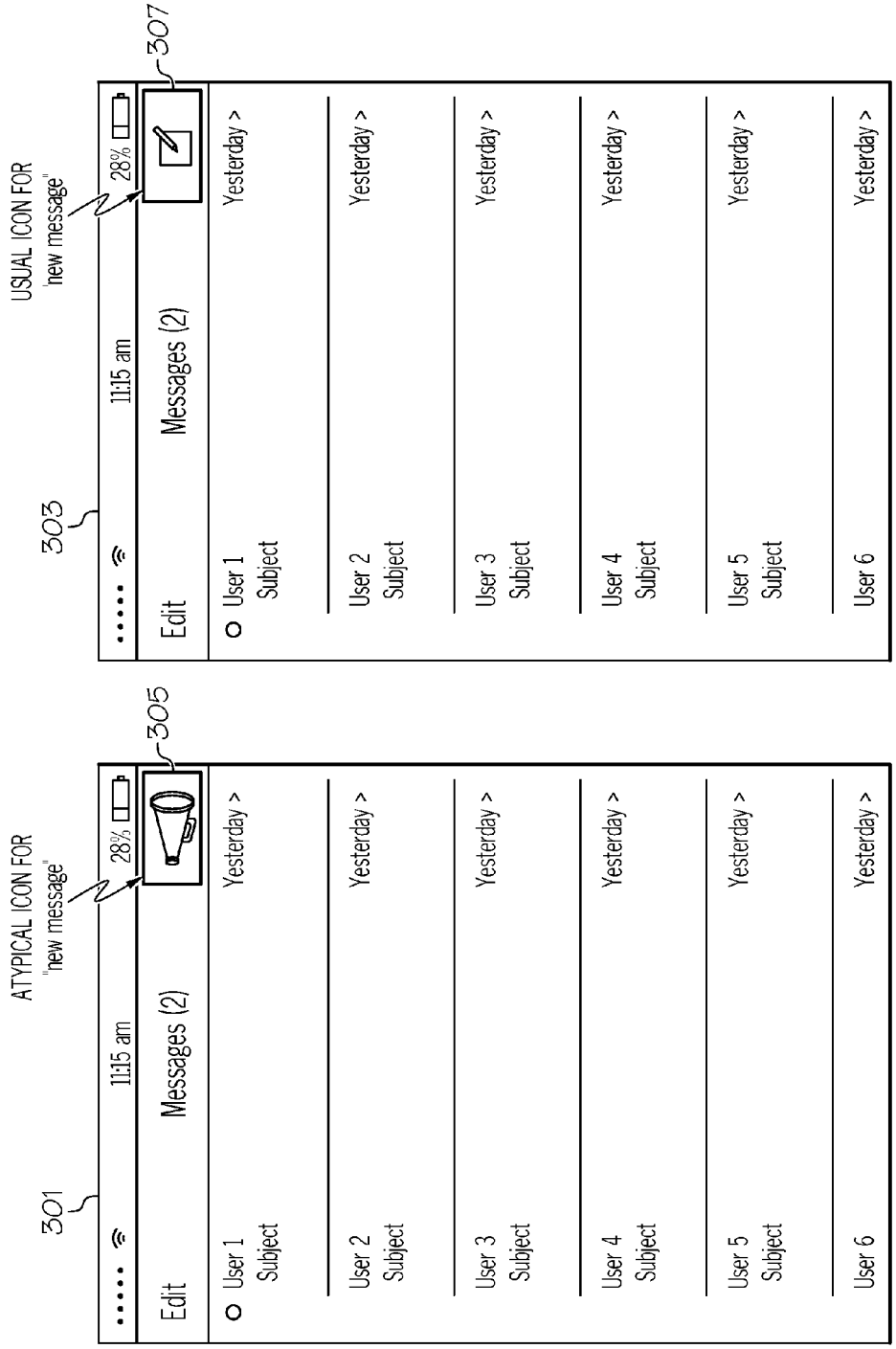
FIG. 3 depicts two exemplary GUIs that respectively use an inappropriate icon and an appropriate icon.
Figure 4:
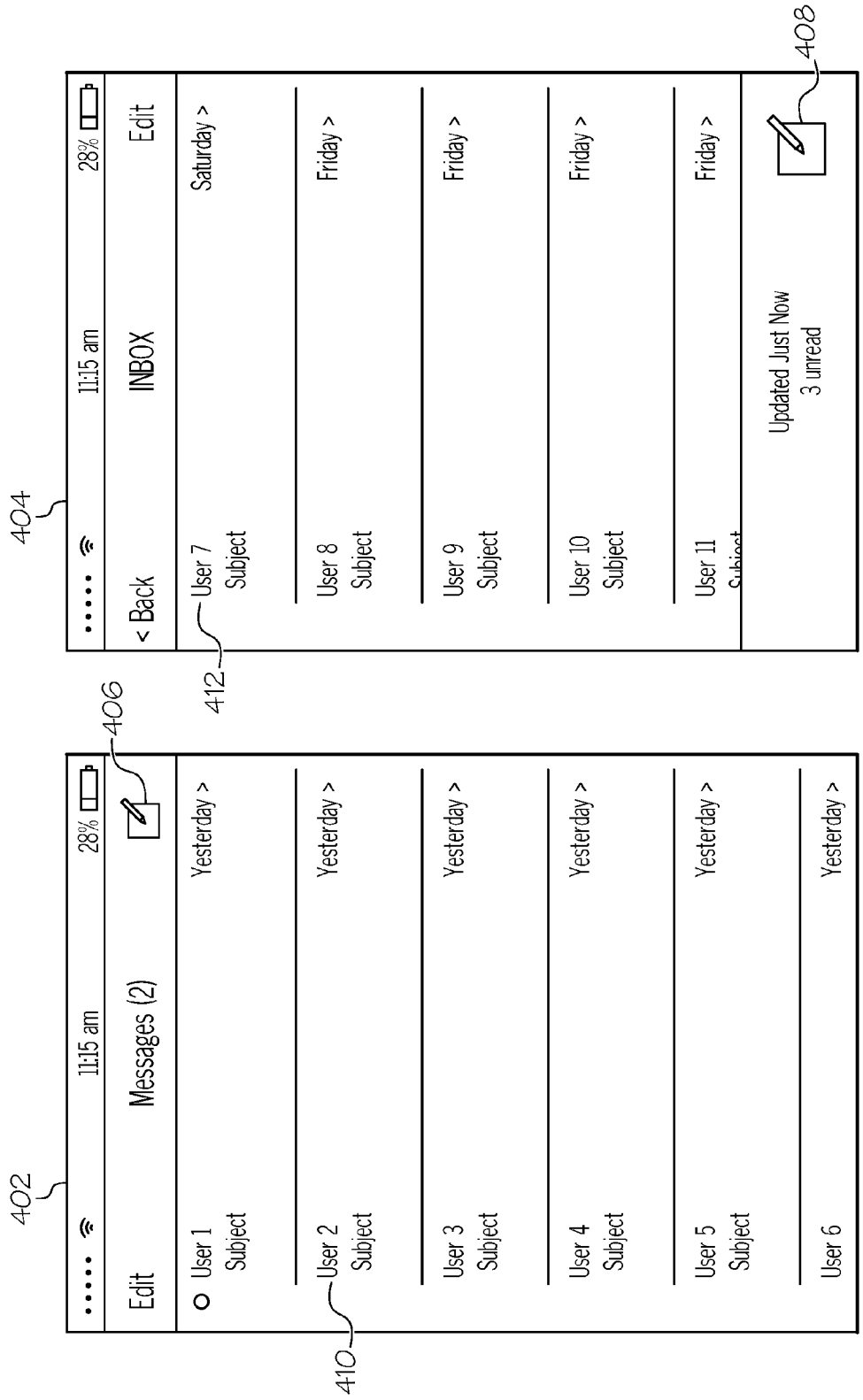
FIG. 4 illustrates two exemplary GUIs that respectively use a proper layout and font and an improper layout and font.

As described in block 912, the processor(s) match a function of a current active field from the current GUI to a function of the top-k active field used by the captured GUIs, where the current active field from the current GUI and the top-k active field used by the captured GUIs provide a same function (e.g., see elements 305 and 307 in FIG. 3).

As described in block 914, the processor(s) compare a visual appearance of the current active field from the current GUI to the top-k active field used by the captured GUIs.

In response to the visual appearance of the current active field from the current GUI not matching the visual appearance of the top-k active field used by the captured GUIs (query block 916), the processor(s) replace the current active field with the top-k active field in the current GUI in order to improve usability of the current GUI (block 918).

The flow-chart ends at terminator block 920.

In one embodiment of the present invention, the current active field is an input field (e.g., a button such as element 206 shown in FIG. 2), such that the visual appearance of the input field is established by a text label displayed on the current GUI for the input field. For example, element 206 in FIG. 2 may be relabeled from "Authenticate" to "Login".

In one embodiment of the present invention, the current active field is an activatable icon, and the visual appearance of the icon is a visual representation of the activatable icon displayed on the current GUI. Thus, the current active field (e.g., element 305 in FIG. 3) is replaced with icon 307 in FIG. 3.

In one embodiment of the present invention, the current active field is an active field that is identified by a text label and the top-k active field is an icon, wherein the active field that is identified by the text label is replaced with the icon. That is, a text-labeled button (e.g., a box labeled "Save") may be replaced with an icon (e.g., a picture of a floppy disk).

In one embodiment of the present invention, processor(s) replace the current active field with the top-k active field in the current GUI by modifying string and layout extensible markup language (XML) script used to generate the current GUI. That, the processor(s) auto-generate string and layout XML script that amends the appearance of the current GUI as described herein.

In one embodiment of the present invention, the current active field displays a text instruction in a first font, the top-k active field displays the text instruction in a second font, and replacing the current active field with the top-k active field in the current GUI is performed by applying the second font to the text instruction in the current active field. (See FIG. 3.)

In one embodiment of the present invention, processor(s) generate a correlation score between the current GUI and each GUI from the captured GUIs, where the correlation score is based on matching the current GUI to captured GUIs based on having the same function, semantics, and context of the current GUI. Each of the captured GUIs is ranked based on the correlation score. The top-k active field from a top-ranked GUI from the captured GUIs is then utilized as a replacement for the current active field in the current GUI. That is, multiple GUIs are deemed to be closely related to the current GUI, as derived from their depicted location in the N-d graphs described herein (see FIG. 8). The closer the depicted GUIs, the higher ranked they are in terms of being more closely aligned based on their functions (i.e., what the app does and/or what functions the widgets provide), semantics (e.g., verbiage used in the widgets/GUI), and context (e.g., the field that the app is used in, such as sports, shopping, etc.).

As described herein, the present invention does not just suggest labels that have meanings similar to currently used labels. Rather, the present invention provides similar famous (i.e., well known and/or commonly used) and end-user intuitive (i.e., are easy to understand) replacement labels/icons to the existing widget labels/icons in the context of the input (current) application.

In one or more embodiments, the present invention is implemented in a cloud environment. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 10:
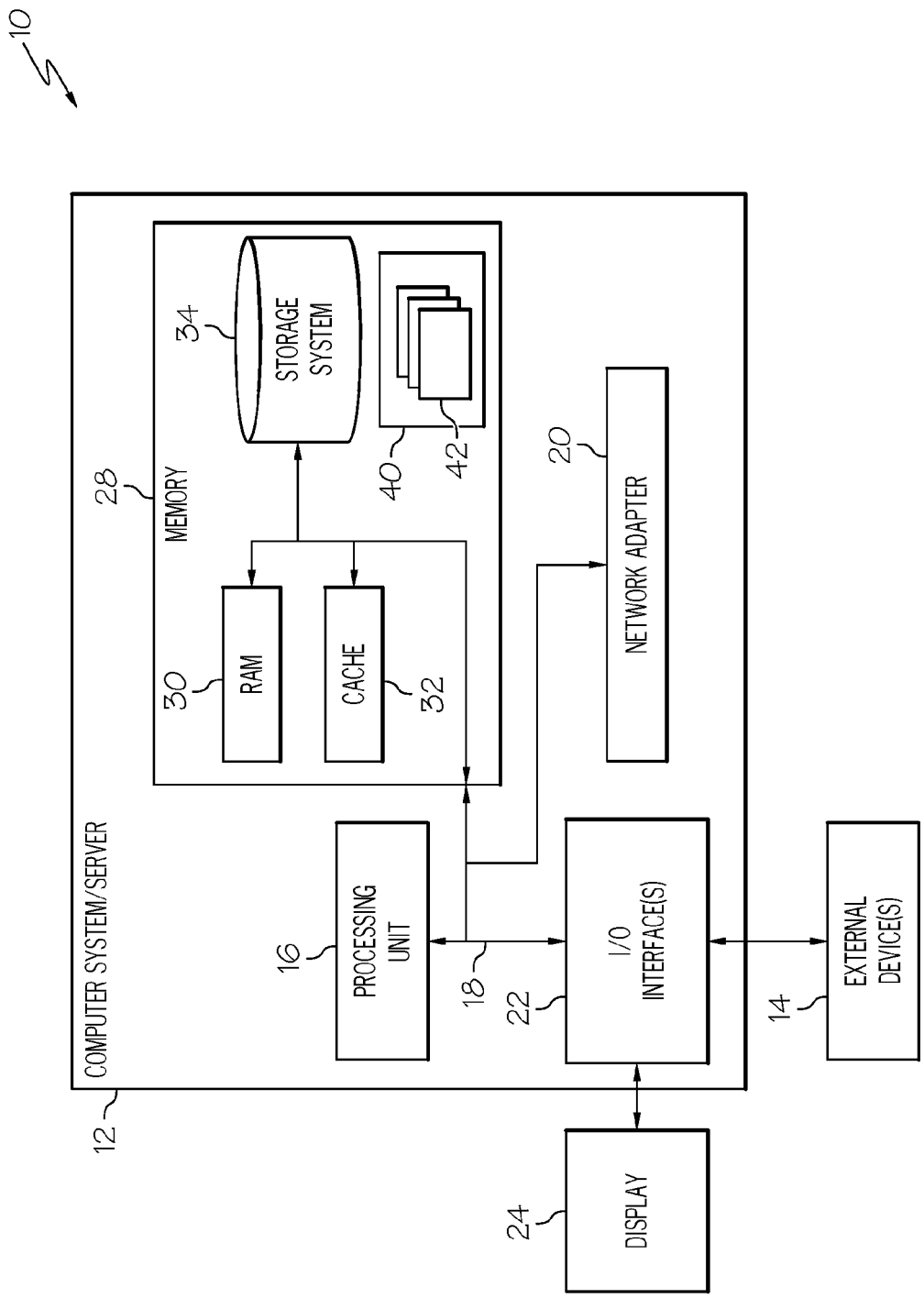
FIG. 10 depicts a cloud computing node according to an embodiment of the present disclosure.

Referring now to FIG. 10, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 11:
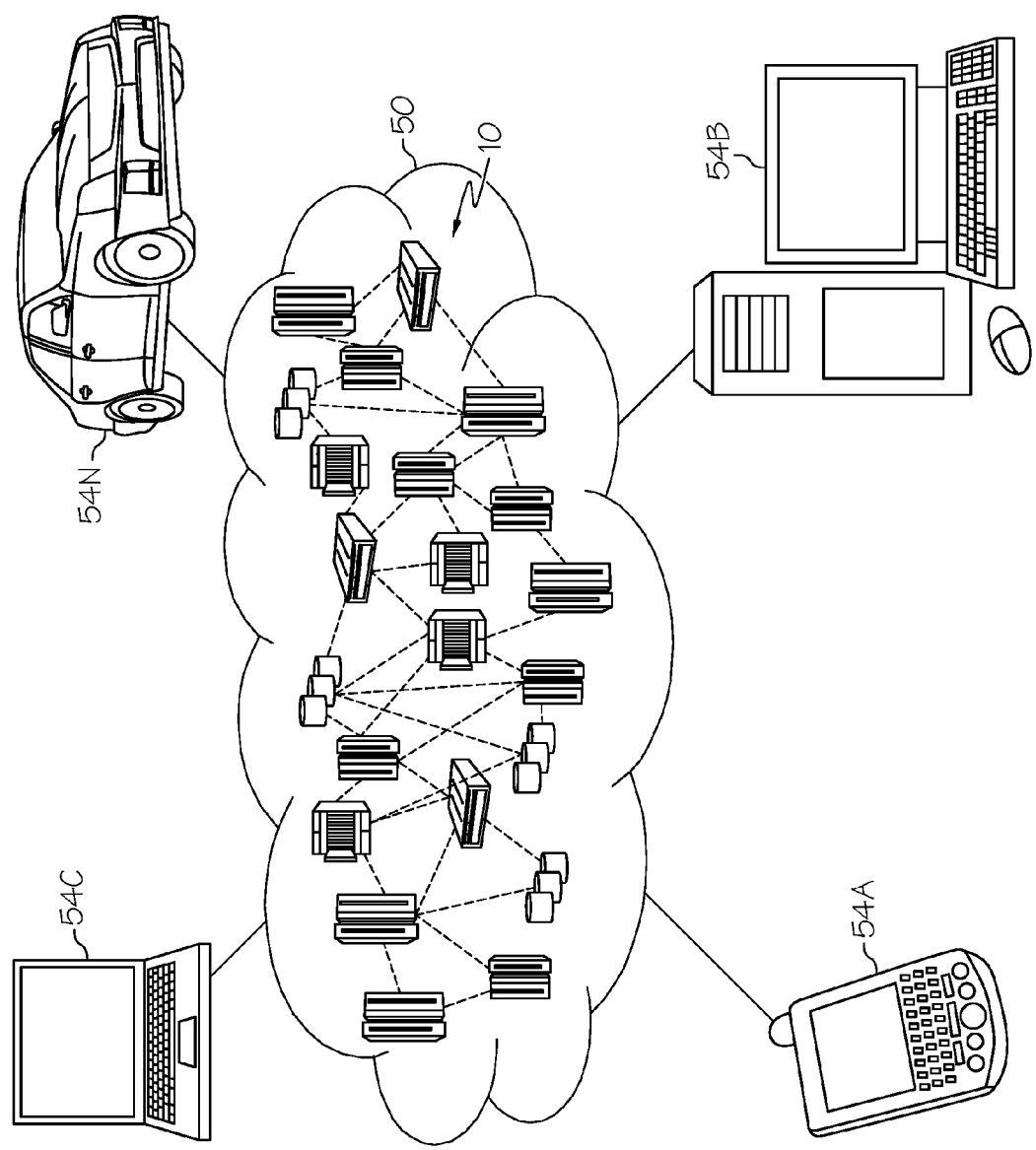
FIG. 11 depicts a cloud computing environment according to an embodiment of the present disclosure.

Referring now to FIG. 11, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 12:
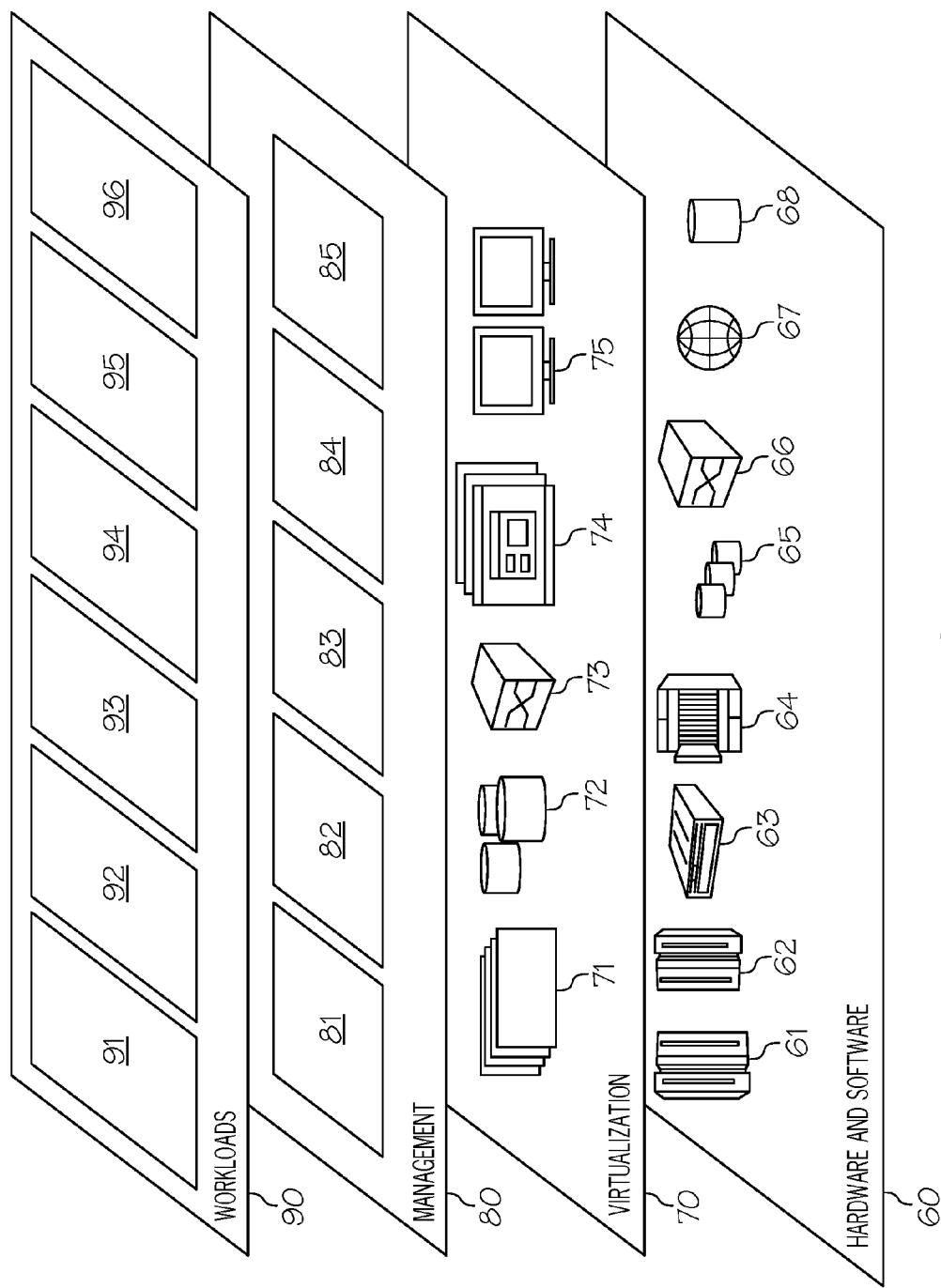
FIG. 12 depicts abstraction model layers according to an embodiment of the present disclosure.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and graphical user interface configuration processing 96 (for adjusting a configuration of a graphical user interface for an application as described herein).

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A processor-implemented method for modifying a graphical user interface (GUI) for an application to improve GUI usability, the processor-implemented method comprising:
   identifying, by one or more processors, a current GUI that is utilized by a current software application;
   matching, by one or more processors, the current GUI to other GUIs that have a same function, semantics, and context of the current GUI;
   identifying, by one or more processors, a top-k active field used by the other GUIs;
   matching, by one or more processors, a function of a current active field from the current GUI to a function of the top-k active field used by the other GUIs; and
   in response to a visual appearance of the current active field from the current GUI not matching a visual appearance of the top-k active field used by the other GUIs, replacing, by one or more processors, the current active field with the top-k active field in the current GUI in order to improve usability of the current GUI.

2. The processor-implemented method of claim 1, wherein the current active field is an input field, and wherein a visual appearance of the input field is established by a text label displayed on the current GUI for the input field.

3. The processor-implemented method of claim 1, wherein the current active field is an activatable icon, and wherein a visual appearance of the icon is a visual representation of the activatable icon displayed on the current GUI.

4. The processor-implemented method of claim 1, wherein the current active field is an active field that is identified by a text label and the top-k active field is an icon, wherein the active field that is identified by the text label is replaced with the icon.

5. The processor-implemented method of claim 1, further comprising:
   replacing, by one or more processors, the current active field with the top-k active field in the current GUI by modifying string and layout extensible markup language (XML) script used to generate the current GUI.

6. The processor-implemented method of claim 1, wherein the current active field displays a text instruction in a first font, wherein the top-k active field displays the text instruction in a second font, and wherein replacing the current active field with the top-k active field in the current GUI is performed by applying the second font to the text instruction in the current active field.

7. The processor-implemented method of claim 1, further comprising:
generating, by one or more processors, a correlation score between the current GUI and each GUI from the other GUIs, wherein the correlation score is based on said matching the current GUI to other GUIs based on having the same function, semantics, and context of the current GUI;
ranking, by one or more processors, each of the other GUIs based on the correlation score; and
utilizing, by one or more processors, the top-k active field from a top-ranked GUI from the other GUIs as a replacement for the current active field in the current GUI.

8. The processor-implemented method of claim 1, wherein the top-k active field is used more frequently than any other active fields in the other GUIs to have the same function, semantics, and context of the current GUI.

9. The processor-implemented method of claim 1, wherein the current active field from the current GUI and the top-k active field used by the other GUIs provide a same function.

10. The processor-implemented method of claim 9, further comprising:
comparing, by one or more processors, the visual appearance of the current active field from the current GUI to the top-k active field used by the other GUIs in order to determine whether the visual appearance of the current active field from the current GUI matches the top-k active field used by the other GUIs.

11. A computer program product for modifying a graphical user interface (GUI) for an application to improve usability of the current GUI, the computer program product comprising a non-transitory computer readable storage medium having program code embodied therewith, the program code readable and executable by a processor to perform a method comprising:
identifying a current GUI that is utilized by a current software application;
matching the current GUI to other GUIs that have a same function, semantics, and context of the current GUI;
identifying a top-k active field used by the other GUIs;
matching a function of a current active field from the current GUI to a function of the top-k active field used by the other GUIs; and
in response to the visual appearance of the current active field from the current GUI not matching the visual appearance of the top-k active field used by the other GUIs, replacing the current active field with the top-k active field in the current GUI in order to improve usability of the current GUI.

12. The computer program product of claim 11, wherein the current active field is an input field, and wherein a visual appearance of the input field is established by a text label displayed on the current GUI for the input field.

13. The computer program product of claim 11, wherein the current active field is an activatable icon, and wherein a visual appearance of the icon is a visual representation of the activatable icon displayed on the current GUI.

14. The computer program product of claim 11, wherein the current active field is an active field that is identified by a text label and the top-k active field is an icon, wherein the active field that is identified by the text label is replaced with the icon.

15. A computer system comprising:
a processor, a computer readable memory, and a non-transitory computer readable storage medium;
first program instructions to identify a current GUI that is utilized by a current software application;
second program instructions to match the current GUI to other GUIs that have a same function, semantics, and context of the current GUI;
third program instructions to identify a top-k active field used by the other GUIs;
fourth program instructions to match a function of a current active field from the current GUI to a function of the top-k active field used by the other GUIs; and
fifth program instructions to, in response to a visual appearance of the current active field from the current GUI not matching a visual appearance of the top-k active field used by the other GUIs, replace the current active field with the top-k active field in the current GUI in order to improve usability of the current GUI; and wherein
the first, second, third, fourth, and fifth program instructions are stored on the non-transitory computer readable storage medium for execution by one or more processors via the computer readable memory.

16. The computer system of claim 15, wherein the current active field is an input field, and wherein a visual appearance of the input field is established by a text label displayed on the current GUI for the input field.

17. The computer system of claim 15, wherein the current active field is an activatable icon, and wherein a visual appearance of the icon is a visual representation of the activatable icon displayed on the current GUI.

18. The computer system of claim 15, wherein the current active field is an active field that is identified by a text label and the top-k active field is an icon, wherein the active field that is identified by the text label is replaced with the icon.

19. The computer system of claim 15, wherein the current active field displays a text instruction in a first font, wherein the top-k active field displays the text instruction in a second font, and wherein replacing the current active field with the top-k active field in the current GUI is performed by applying the second font to the text instruction in the current active field.

20. The computer system of claim 15, further comprising:
sixth program instructions to generate a correlation score between the current GUI and each GUI from the other GUIs, wherein the correlation score is based on said matching the current GUI to other GUIs based on having the same function, semantics, and context of the current GUI;
seventh program instructions to rank each of the other GUIs based on the correlation score; and
eighth program instructions to utilize the top-k active field from a top-ranked GUI from the other GUIs as a replacement for the current active field in the current GUI; and wherein the sixth, seventh, and eighth program instructions are stored on the non-transitory computer readable storage medium for execution by one or more processors via the computer readable memory.

* * * * *